(12) United States Patent
Herzig et al.

(10) Patent No.: US 7,939,619 B2
(45) Date of Patent: May 10, 2011

(54) ORGANOSILICON COMPOUNDS THAT CONTAIN β-KETOAMIDE GROUPS AND ORGANIC POLYMERS BOUND VIA ENAMINE BONDS, AND METHOD FOR PRODUCING THEM

(75) Inventors: Christian Herzig, Waging (DE); Siegfried Dormeier, Stubenberg (DE)

(73) Assignee: Wacker Chemie AG, Munich (DE)

( * ) Notice: Subject to any disclaimer, the term of this patent is extended or adjusted under 35 U.S.C. 154(b) by 364 days.

(21) Appl. No.: 12/299,545

(22) PCT Filed: Apr. 23, 2007

(86) PCT No.: PCT/EP2007/053958
§ 371 (c)(1), (2), (4) Date: Nov. 4, 2008

(87) PCT Pub. No.: WO2007/128680
PCT Pub. Date: Nov. 15, 2007

(65) Prior Publication Data
US 2009/0176959 A1    Jul. 9, 2009

(30) Foreign Application Priority Data

May 4, 2006 (DE) .......................... 10 2006 020 816

(51) Int. Cl.
*C08G 77/26* (2006.01)
(52) U.S. Cl. ......................................... 528/38; 525/474
(58) Field of Classification Search .................... 528/38; 525/474
See application file for complete search history.

(56) References Cited

U.S. PATENT DOCUMENTS

| | | |
|---|---|---|
| 4,808,649 A | 2/1989 | Gay |
| 5,952,443 A | 9/1999 | Wilt |
| 6,121,404 A | 9/2000 | Liles |
| 2006/0058451 A1* | 3/2006 | Gommans et al. ............ 524/588 |

FOREIGN PATENT DOCUMENTS

| | | |
|---|---|---|
| GB | 1154726 A | 6/1969 |
| GB | 1218509 A | 1/1971 |
| WO | 2007060089 A | 5/2007 |

* cited by examiner

*Primary Examiner* — Kuo-Liang Peng
(74) *Attorney, Agent, or Firm* — Brooks Kushman P.C.

(57) ABSTRACT

Organosilicon compounds containing β-ketoamide groups and organic polymer groups bound via enamine bonds are prepared by reaction of compounds bearing at least one β-ketocarbonyl functionality with organosilicon compounds bearing aminoalkylaminoalkyl groups. The products have the same uses as siloxanes containing polyether and acetoacetate groups.

9 Claims, No Drawings

ORGANOSILICON COMPOUNDS THAT CONTAIN β-KETOAMIDE GROUPS AND ORGANIC POLYMERS BOUND VIA ENAMINE BONDS, AND METHOD FOR PRODUCING THEM

CROSS-REFERENCE TO RELATED APPLICATIONS

This application is the U.S. national phase of PCT Appln. No. PCT/EP2007/053958 filed Apr. 23, 2007 which claims priority to German application DE 10 2006 020 816.1 filed May 4, 2006.

BACKGROUND OF THE INVENTION

1. Field of the Invention

The invention relates to organosilicon compounds which contain β-ketoamide groups and organic polymers bound via enamine bonds, and methods for producing them.

2. Description of the Related Art

U.S. Pat. No. 6,121,404 describes siloxanes which contain polyether chains and acetoacetate groups in a single molecule. These polymers are obtained by hydrosilylation of unsaturated polyethers with hydrogensiloxanes and subsequent reaction of the intermediate with diketene or an active derivatives thereof. According to this method, owing to the partial rearrangement of allylpolyethers to give propenyl isomers, it is necessary to use a correspondingly large excess of the unsaturated polyether, which cannot be removed. This excess also reacts with diketene and thus also contains acetoacetate groups, but is not bound to the siloxane. Expensive noble metal catalysts are required for the hydrosilylation. Furthermore the acetoacetate groups are not bound directly to the siloxane in the main product but form the terminal groups of the polyethers added beforehand.

Methods for reacting polymeric compounds, such as polyethers, polyacetates, polyetheracetals, polyesters or polyesterpolyols, with diketene or acetoacetates are disclosed in GB 1154726 and GB 1218509. The polymers used contain at least one carbinol group and the products accordingly contain at least one acetoacetyl group.

SUMMARY OF THE INVENTION

It was an object of the invention to provide organosilicon compounds which have both a hydrophilic organic radical and β-ketoamide groups, and which can be prepared via a simple method, it being intended to avoid the disadvantages described above. These and other objects are achieved by the invention, wherein organosilicon compounds bearing at least one Si—C bonded amino group as defined hereinafter are reacted with compounds containing at least one β-ketocarbonyl functional radical.

DETAILED DESCRIPTION OF THE PREFERRED EMBODIMENT(S)

The invention thus relates to organosilicon compounds (1) which contain at least one Si-bonded radical of the general formula

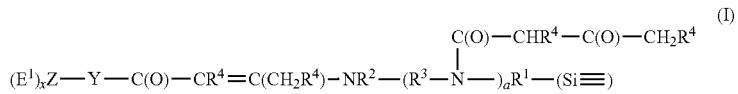
(I)

in which

—(Si≡) represents the bonding to the silicon atom, $R^1$ is a divalent organic radical having 1 to 6 carbon atoms, which may optionally contain nitrogen atoms separate from one another, preferably a divalent hydrocarbon radical having 1 to 6 C atoms which may optionally contain one or more nitrogen atoms separate from one another, $R^2$ is a hydrogen atom or an organic radical having 1 to 30 C atoms, preferably a hydrogen atom or hydrocarbon radical having 1 to 30 C atoms, $R^3$ is a divalent organic radical having 1 to 6 carbon atoms, preferably having 2 to 6 carbon atoms, preferably a divalent hydrocarbon radical having 2 to 6 carbon atoms, $R^4$ is a hydrogen atom or a hydrocarbon radical having 1 to 18 C atoms, Y is oxygen or —$NR^2$—, preferably oxygen, Z is a divalent to hexavalent organic radical having a monomeric, oligomeric or polymeric structure, which has a heteroatom content of at least 10% by weight and is bonded via C atoms, $E^1$ is a monofunctional terminal group or an Si—C-bonded radical of the general formula

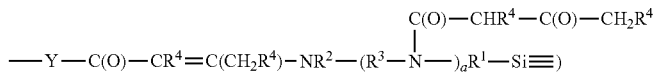

a is an integer from 1 to 5, preferably 1 or 2, and
x is 0 or an integer from 1 to 5, preferably 0 or 1, preferably 1.

The invention furthermore relates to a method for producing organosilicon compounds (1) which contain at least one Si-bonded radical of the general formula

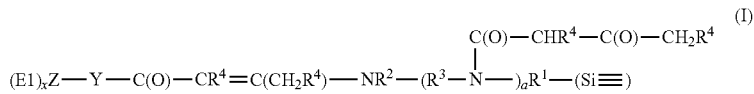

in which
R$^1$, R$^2$, R$^3$, R$^4$, Y, Z, E$^1$, a and x have the meanings stated above therefore,
in which, in a first stage,
aminosilicon compounds (2) which contain at least one Si—C-bonded amino group A of the general formula $$HNR^2—(R^3—NH—)_aR^1—(Si\equiv) \qquad (II)$$

are reacted with compounds (3), which contain at least one β-ketocarbonyl functional radical, of the general formula $$(E^2)_xZ—Y—C(O)—CR^4\!=\!C(CH_2R^4)—OH \qquad (IIIa) \text{ or}$$

$$(E^2)_xZ—Y—C(O)—CHR^4—C(O)—CH_2R^4 \qquad (IIIb),$$

organosilicon compounds (1') of the general formula $$(E^2)_xZ—Y—C(O)—CR^4\!=\!C(CH_2R^4)—NR^2—(R^3—NH—)_aR^1—(Si\equiv) \qquad (I')$$

being obtained, in which
R$^1$, R$^2$, R$^3$, R$^4$, Y, Z, a and x have the meanings stated above therefore, and
E$^2$ is a monofunctional terminal group or a radical of the general formula —Y—C(O)—CR$^4$=C(CH$_2$R$^4$)—OH or —Y—C(O)—CHR$^4$—C(O)CH$_2$R$^4$,
and, in a second stage,
the organosilicon compounds (1') obtained in the first stage are reacted with diketenes (4) of the general formula

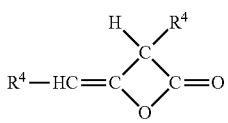

in which
R$^4$ has the meanings stated above therefore.

In the method according to the invention, the aminosilicon compounds (2) are reacted in a first stage with acetoacetyl compounds (3) of the tautomeric forms (IIIa) or (IIIb) and, in a subsequent second stage, are reacted with diketenes (4). This reaction sequence can advantageously be carried out in a one-pot process. A particularly preferred procedure is the upstream preparation of compounds (3) from the underlying base compounds (5) by reaction of these with diketenes (4), after which aminosilicon compounds (2) are metered in at the end of the reaction and, by further metering of diketenes (4) after the reaction thereof, the organosilicon compounds (1) according to the invention are then obtained in a particularly economical method.

Preferred examples for Si—C-bonded amino groups A of the formula (II) are

H$_2$N—C$_2$H$_4$—NH—CH$_2$—

H$_2$N—C$_3$H$_6$—NH—CH$_2$—

H$_2$N—C$_3$H$_6$—NH—C$_3$H$_6$—NH—CH$_2$—

H$_2$N—C$_2$H$_4$—NH—C$_3$H$_6$—

H$_2$N—C$_3$H$_6$—NH—C$_3$H$_6$—

H$_2$N—C$_2$H$_4$—NH—C$_2$H$_4$—NH—C$_3$H$_6$—

H$_2$N—C$_3$H$_6$—NH—C$_3$H$_6$—NH—C$_3$H$_6$—

H$_2$N—C$_2$H$_4$—NH—C$_4$H$_8$—

R$^2$ is preferably a hydrogen atom.
R$^3$ is most preferably an alkylene radical having 2 to 6 carbon atoms.
R$^4$ is preferably a hydrogen atom.
Z preferably has a heteroatom content of at least 20% by weight and more preferably at least 25% by weight.

Aminosilicon compounds (2) are preferably organopolysiloxanes having at least one Si—C-bonded radical A of the formula (II).

Preferred aminosilicon compounds (2) are organopolysiloxanes of the general formula $$A_gR_{3-g}SiO(SiR_2O)_l(SiRAO)_kSiR_{3-g}A_g \qquad (V),$$

in which A has the meaning stated above therefor,
R is a monovalent hydrocarbon radical having 1 to 18 C atoms,
g is 0 or 1,
k is 0 or an integer from 1 to 30 and
l is 0 or an integer from 1 to 1000,
with the proviso that at least one radical A per molecule is present.

Preferred aminosilicon compounds (2) contain amine group concentrations in the range from 0.01 to about 10 mequiv./g, in particular from about 0.05 to 5 mequiv./g. Preferred viscosities are in the range from about 100 to 50,000 mPa·s at 25° C., the range of 500 to 10,000 mPa·s at 25° C. being particularly preferred.

Aminosilicon compounds (2) are preferably used without prior conversion of the amino groups by means of protective group reagents, such as aldehydes or ketones.

The aminosilicon compounds (2) are preferably produced from "diamino" monomers, such as aminoethylaminopropyl- or aminoethylaminoisobutylsilanes, the Si—C-bonded amino group A containing both a primary and a secondary amine radical, bonded to the same Si atom. In the radicals A, the primary amine radicals react preferentially with the compounds (3), the secondary amine radicals being retained as basic centers.

The compounds (3) can be used as reactants for the aminosilicon compound (2) in two tautomeric forms of the formulae (IIIa) and (IIIb).

The compounds (3) are preferably obtained by reacting the underlying base compounds (5) of the formula (E$^2$)$_x$Z—Y (VI), which are saturated with hydrogen at the free valencies, E$^2$, Z and Y having the meaning stated above therefore, with the diketenes, acetylketenes, alkyldiketenes, diketene-acetone adducts or acetoacetates, preferably with diketenes or the acetone adducts thereof, by methods known in the literature.

The radical "Z" is defined as an organic radical which, owing to its bifunctionality to hexafunctionality, is bonded with 2 to 6 further groups E or Y: the sum of "E" plus "Y" corresponds in its numerical value to this bifunctionality to hexafunctionality. In the simplest case, which is also preferred, "Z" is bifunctional, i.e. divalent. In this case, "Z" is bonded either to two Y groups or to one Y group and one monofunctional terminal group. Monofunctional terminal groups may be saturated or unsaturated hydrocarbon radicals having 1 to 18 C atoms or acyl radicals, such as the acetate, butyrate, palmitate or stearate radical, as well as the acrylate, methacrylate or benzoate radical.

The radical "Z" has a heteroatom content of at least 10% by weight. Heteroatoms are selected from the group consisting of O, N, B, P and S atoms, preferably O and N atoms, more preferably O atoms. The radical "Z" has the function of introducing higher polarity and hence a higher degree of hydrophilicity into the organosilicon compounds (1) according to the invention, and it is for this reason that a higher content of heteroatoms is preferred. The radical "Z" is most preferably a polyether or polyester. Examples of polyethers are polyethylene oxide, polypropylene oxide or polybutylene oxide (also poly-THF) and also copolymers of the general formula $(C_aH_{2a}O)_nC_aH_{2a}$, where a=2, 3 or 4 and n is an integer from 1 to 500, preferably 1 to 100 and most preferably 5 to 60.

Trifunctional to hexafunctional radicals "Z" are usually started from alcohols having the same functionality as well as from amines. Thus, trimethylolpropane or ammonia together with ethylene oxide gives base compounds (5) with "Z" of the general formula $C_2H_5C[CH_2(OC_2H_4)_{m/3}]_3$ or $N[C_2H_4(OC_2H_4)_{(m-1)/3}]_3$, where m is the total number of moles of ethylene oxide, preferably from 5 to 100, the free valencies of which are bonded to oxygen atoms (Y), which in turn are saturated with hydrogen. For the preparation of base compounds (5) having a higher functionality, the correspondingly more highly functionalized carbinol or amino compounds are usually used: tetrafunctionality from pentaerythritol or ethylenediamine, hexafunctionality from sorbitol or tris(aminoethyl)amine.

Corresponding polyesters can be prepared from identical or similar starter compounds by ring-opening polymerization of cyclic esters (lactones) by generally known methods. Preferred base compounds (5) are polyethylene glycol, polypropylene glycol and the copolymers thereof and the monoalkyl ethers thereof. The latter constitute a special case where "Y" is oxygen and "E" is an alkyl group (methyl, alkyl, butyl). Regarding the conversion into compounds (3), these base compounds (5) are monofunctional. Compared with the aminosilicon compounds (2), the compounds (3) produced therefrom are also monofunctional and accordingly serve for saturating amino groups with polar polymers.

In contrast, bifunctional reactants (3), which have a chain-extending action with respect to likewise bifunctional aminosilicon compounds (2), i.e. which contain two amino groups A per molecule, are obtained from polyalkylene glycols. In this way, it is also possible to obtain branched products (1), provided that the aminosilicon compounds (2) contain at least three amino groups A per molecule. An alternating siloxane-polyether structure forms.

The surprisingly high selectivity of the compounds (3) with primary amine radicals in the amino groups A of the aminosilicon compounds (2) permits virtually complete conversion of the $H_2N$ radicals into enamines, and it is for this reason that a stoichiometric ratio of primary $NH_2$ radicals in amino groups A of compounds (2) to acetoacetyl groups in compounds (3) close to 1.0, preferably between 0.8 to 1.0, is used in the first stage of the method according to the invention. However, it may also be above 1.0. In this case, not all primary amine radicals are reacted, which, however, are then additionally available for reaction with diketenes (4). Although this procedure is technically possible, it is not preferred.

In the method according to the invention, the acetone adducts of diketenes (4) can also be used as the diketenes. Preferably used diketenes (4) are

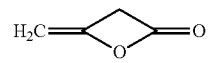

or the acetone adducts thereof.

In the method according to the invention, the stoichiometric ratio of secondary —NH groups in amino groups A of compounds (2) to diketenes (4) is from 5:1 to 0.5:1, preferably from 2:1 to 0.8:1, in the subsequent reaction with diketenes (4). A ratio of about 1:1 is particularly preferred.

The method according to the invention can be effected in the presence of organic solvents or the products (1) according to the invention can be diluted with organic solvents.

The reaction of the compounds (3) with aminosilicon compounds (2) in the first stage of the method according to the invention takes place spontaneously even without external heating, but supply of heat accelerates the synthesis of (1).

The method according to the invention is preferably carried out at temperatures of from 10 to 100° C., preferably from 40 to 80° C. Furthermore, the method according to the invention is preferably carried out at the pressure of the ambient atmosphere but can also be carried out at higher and lower pressures.

EXAMPLE 1

411 g of an acetoacetylpolyether, prepared from a monofunctional polyether of the formula $C_4H_9O(C_2H_4O)_{18.0}(C_3H_6O)_{17.4}H$ and diketene, having an acetoacetyl concentration of 0.51 mequiv./g, are mixed with 250 g of a copolymer comprising aminoethylaminopropyl methylsiloxane units and dimethylsiloxane units and having a viscosity of 830 mm²/s (25° C.) and an amine number of 1.597 and are heated to 70° C. with stirring. Thus, a stoichiometry of $H_2N$/acetoacetyl of 0.95 is established. The very turbid mixture clears after about 20 minutes. Pulsed reaction for two hours at the same temperature leads to a considerable increase in viscosity, which is considerably moderated by addition of 70 g of isopropanol. Metering in of 16.8 g of diketene immediately leads to a substantially exothermic reaction with further increase in viscosity. A further 156 g of isopropanol are added and slowly stirred in. A 75% strength solution of a silicone polymer which contains polyether chains grafted via enamine and simultaneously also β-ketoamido groups is obtained. The solution contains 0.22 mequiv. of these groups per g. The polymer solution is miscible with water to give a clear solution.

EXAMPLE 2

116 g of a PEG-1000 bis(acetoacetate) having an average molecular weight of 1106 g are melted at 70° C. At the same temperature, 263 g of an α,ω-bis(aminoethylaminopropyl) dimethylpolysiloxane are metered in. The viscosity of the mixture increases considerably and the mixture clears. After a further 3 hours at 70° C., 8.4 g of diketene are metered in, whereupon a further increase in viscosity follows in an exothermic reaction. After cooling, a highly viscose oil having an acetoacetamide content of 0.26 mequiv./g and the same concentration of acetoacetate groups from the polyether excess used is obtained. An 80% strength solution of the polymer in butyldiglycol can be dispersed in the same amount of water without relatively strong shearing.

The invention claimed is:

1. An organosilicon compound (1) which comprises at least one Si-bonded radical of the formula

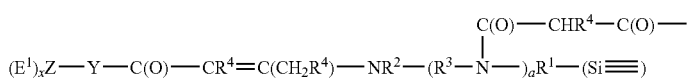

in which
- —(Si≡) is the bond to silicon atom of the organosilicon compound,
- $R^1$ is a divalent organic radical having 1 to 6 carbon atoms which optionally contains non-adjacent nitrogen atoms,
- $R^2$ is a hydrogen atom or an organic radical having 1 to 30 C atoms,
- $R^3$ is a divalent organic radical having 1 to 6 carbon atoms,
- $R^4$ is a hydrogen atom or a hydrocarbon radical having 1 to 18 C atoms,
- Y is oxygen or —$NR^2$—,
- Z is a divalent to hexavalent organic radical having a monomeric, oligomeric or polymeric structure, which has a heteroatom content of at least 10% by weight and is bonded via C atoms,
- $E^1$ is a monofunctional terminal group or an Si—C— bonded radical of the formula

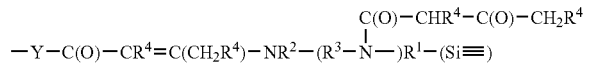

- a is an integer from 1 to 5, and
- x is an integer from 1 to 5.

2. The organosilicon compound (1) of claim 1, wherein $R^2$ is a hydrogen atom.

3. The organosilicon compound (1) of claim 1, wherein $R^4$ is a hydrogen atom.

4. The organosilicon compound (1) of claim 1, wherein x is 0 or 1.

5. The organosilicon compound (1) of claim 1, wherein Z is a polyether or polyester radical.

6. A method for producing organosilicon compounds (1) of claim 1, which contain at least one Si-bonded radical of the formula

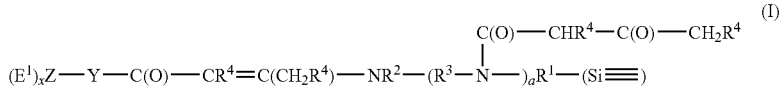

comprising reacting, in a first stage, aminosilicon compounds (2) which contain at least one Si—C—bonded amino group A of the formula

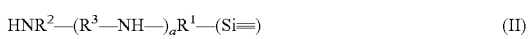

with compounds (3) which contain at least one β-ketocarbonyl functional radical, of the formulae

 (IIIa) or

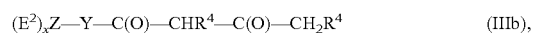 (IIIb), organosilicon compounds (1') of the formula

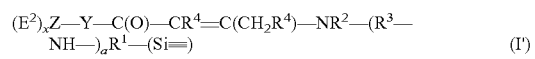 (I')

being obtained, wherein $E^2$ is a monofunctional terminal group or a radical of the formulae

and, reacting in a second stage, the organosilicon compounds (1') obtained in the first stage with diketenes (4) of the formula

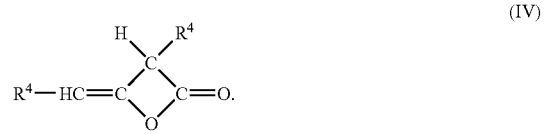 (IV)

7. The method of claim 6, wherein the amino group A in compound (2) is an aminoethylaminopropyl radical.

8. The method of claim 6, wherein the aminosilicon compounds (2) include organopolysiloxanes of the formula $A_g R_{3-g} SiO(SiR_2O)_l(SiRAO)_k SiR_{3-g}A_g$ (V), wherein R is a monovalent hydrocarbon radical having 1 to 18 C atoms, g is 0 or 1, k is 0 or an integer from 1 to 30 and l is 0 or an integer from 1 to 1000, with the proviso that at least one radical A per molecule is present.

9. The method of claim 6, wherein

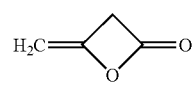

or the acetone adducts thereof are used as diketenes (4).

* * * * *